United States Patent
Nemeth et al.

[11] 3,837,228
[45] Sept. 24, 1974

[54] TRACER GAS-PERMEABLE PROBE FOR LEAK DETECTORS

[75] Inventors: Robert C. Nemeth, Huntington Station, N.Y.; Willaim D. Dugger, Kimberton, Pa.

[73] Assignee: Vacuum Instrument Corporation, Huntington Station, N.Y.

[22] Filed: Apr. 9, 1973

[21] Appl. No.: 349,616

[52] U.S. Cl. ............................................. 73/40.7
[51] Int. Cl. ........................................ G01m 3/20
[58] Field of Search .................. 73/23, 40.7; 55/16

[56] References Cited
UNITED STATES PATENTS

| | | | |
|---|---|---|---|
| 3,239,996 | 3/1966 | Huffman et al. | 55/16 |
| 3,280,619 | 10/1966 | Spies | 73/40.7 |
| 3,757,587 | 9/1973 | Ahnsorge | 73/45.4 |

FOREIGN PATENTS OR APPLICATIONS

| | | | |
|---|---|---|---|
| 1,181,312 | 1/1959 | France | 73/40.7 |

*Primary Examiner*—S. Clement Swisher
*Attorney, Agent, or Firm*—Rose & Edell

[57] ABSTRACT

In a leak detector system which employs a predetermined tracer gas, such as helium, the detector probe is provided with a plastic film which is selectively permeable to the tracer gas in preference to all other atmospheric gases. All detected gases must pass through the film in order to reach the detection element. Because of the selective permeability of the film the probe can assume substantially any size and configuration and can be employed without preparing a contaminant free environment. Moreover, the selectivity of the probe film permits the detection element to be a simple flow monitoring device rather than a mass spectrometer or other gas-distinguishing apparatus.

8 Claims, 5 Drawing Figures

PATENTED SEP 24 1974　　　　　　　　　　　　　　　3,837,228
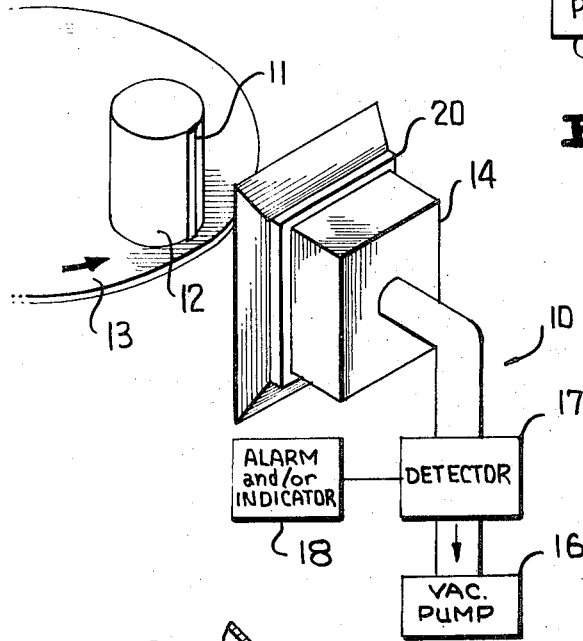
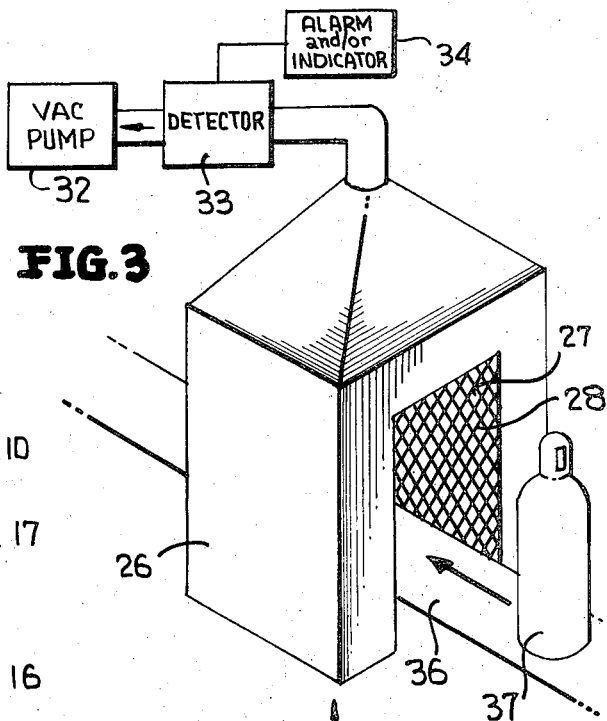
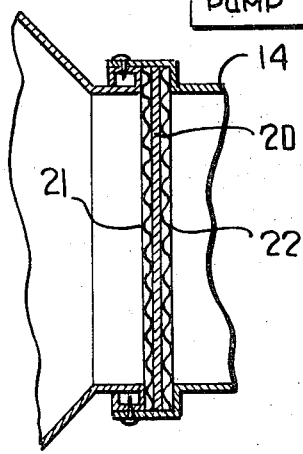
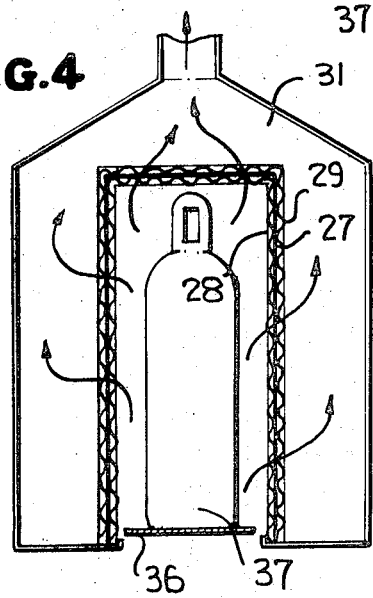
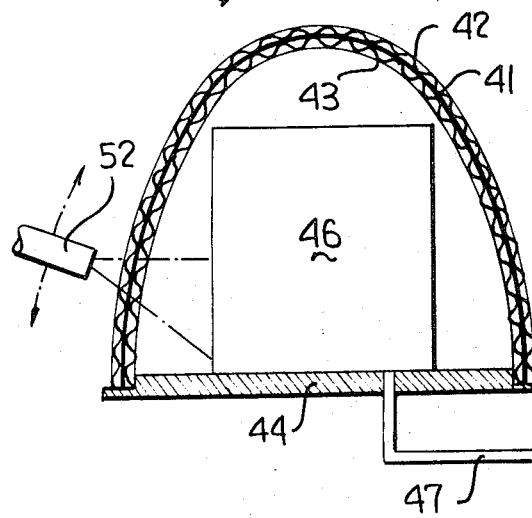
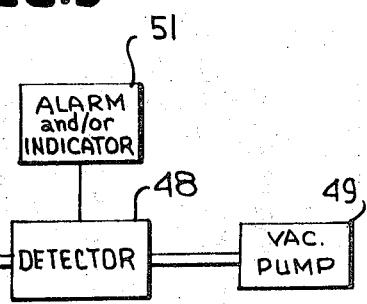

TRACER GAS-PERMEABLE PROBE FOR LEAK DETECTORS

BACKGROUND OF THE INVENTION

The present invention relates to the detection of leaks in closed systems, such as vessels, pipes, etc. More particularly, the present invention relates to an improved probe arrangement for leak detectors.

It is well known to detect leaks in closed systems through the use of a pressurized tracer gas. The tracer gas passes through leaks in the system under test to the surrounding atmosphere where it is drawn into the leak detector through an orifice-type probe. The leak detector, upon sensing the increase of tracer gas in the probe inflow, registers an indication of a leak in the system. A typical prior art system of this type may be found in U.S. Pat. No. 2,996,661. The pressure which induces flow into the probe is limited by maximum pressure which can be tolerated by the tracer gas detection apparatus. The flow induced by this pressure is further limited by the small orifice at the probe tip, which orifice is necessary to provide at least a minimal degree of selectivity of the region from which the probe inflow is drawn. In other words, if the probe orifice were not small, tracer gas leaking from the system under test would be diluted by atmospheric air also drawn into the probe, thereby severely reducing the detection sensitivity of the overall apparatus. However the small orifice combined with the limited pressure results in a very small inflow rate (i.e. — nominally $10^{-3}$ std. cc./sec.). This severely limits the response time of the leak detector and also requires the probe to be placed very close to the suspected leak in order to draw any significant amount of tracer gas into the leak detector.

Another limiting characteristic of orifice-type probes also relates to the small orifice size. Specifically, the probe must be moved to traverse the entire portion of the unit under test which is subject to leakage. As a consequence, a detection operation is time-consuming and requires either an operator or complex machinery to move the probe.

Still another disadvantage of small orifice type probes relates to their tendency to become clogged by contaminants in the environment. Such clogging can result from an accumulation of such contaminants so that a periodic thorough cleaning of the probe and the entire gas inflow line is required. Moreover, it is necessary to clean and dry both the detection environment and the units under test to minimize contaminant clogging.

It is therefore an object of the present invention to provide a leak detector probe which is devoid of the disadvantages inherent in orifice-type probes.

It is another object of the present invention to provide a leak detector probe capable of a greater gas inflow rate than was possible in the prior art without sacrificing detection sensitivity.

It is another object of the present invention to provide a leak detector probe having a flow opening which can be configured in substantially any size and shape without sacrificing detection sensitivity.

It is still another object of the present invention to provide a leak detector probe which significantly minimizes contaminant clogging in the probe and in the remainder of the gas inflow path, and which can be used without requiring special cleaning of the environment and the units to be tested.

The fact that conventional probes do not discriminate as to the gases passed into the leak detector necessitates the use of expensive tracer gas detection devices in the leak detector. Specifically, mass spectrometers, titanium sorption detectors, etc. are necessary to monitor the inflow of helium or other tracer gas in the presence of inflowing ambient gases.

It is an object of the present invention to provide a leak detector having a probe which selectively passes the tracer gas to eliminate the need for a constituent-discriminating detector.

SUMMARY OF THE INVENTION

In accordance with the principles of the present invention the inflow opening in a leak detector probe is covered with a plastic film which selectively passes the tracer gas at significantly greater rate than atmospheric gases. This selectivity permits the probe inflow opening to be as large as desired, thereby greatly increasing the tracer gas inflow rate for a given suction pressure. The greater inflow rate increases the detector response time of the leak detector; yet the sensitivity of the detector is increased due to the selective permeability of the tracer gas through the film. The probe opening can assume substantially any configuration, rendering it ideally suitable for quickly detecting leaks anywhere in a system having an enclosure configuration. Further, the film prevents contaminants from entering the detector, thereby facilitating maintenance of the detector and eliminating the requirement for cleaning and testing the environment and the system under test. In addition, since the inflow to the detector is selective to the tracer gas, a simple flow detector may be utilized as the leak detecting element.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings, wherein:

FIG. 1 is a partially diagrammatic illustration of a leak detector according to one embodiment of the present invention;

FIG. 2 is a partial side view in section of the probe employed in the leak detector of FIG. 1;

FIG. 3 is a partially diagrammatic view in perspective of another leak detector embodiment of the present invention;

FIG. 4 is a front view in section of the leak detector of FIG. 3; and

FIG. 5 is a diagrammatic illustration of still another leak detector embodiment according to the present invention.

DESCRIPTION OF THE PREFERRED EMBODIMENTS

Referring specifically to FIG. 1 of the accompanying drawings, a leak detector 10 is arranged to detect leaks in the seams 11 of containers 12. The closed containers are pressurized with a tracer gas, for example helium, and are transported past the fixed leak detector location by a conveyor 13. Leak detector 10 includes a probe 14 having a flow inlet opening of relatively large cross-section. In the embodiment illustrated, the height of the flow opening is approximately equal to the height of containers 12 so that leaks anywhere along the seam may be detected without moving probe 14. The probe opening is covered by a plastic film 20 (described in greater detail below) which is exceedingly more permeable to the tracer gas than to atmospheric gases in the test environment. Gas is drawn toward the probe opening by means of a vacuum pump 16. Any gas passing through plastic film 20 is drawn by pump 16 through a conventional tracer gas detector 17, such as a mass spectrometer, titanium sorption detector, etc., where the quantity of tracer gas in the inflow of tracer gas is measured. Alternatively, as described below, detector 17 may be a simple gas flow detector which does not discriminate between constituents of the gas. The measurement is indicated at the alarm and/or indicator unit 18; alternatively, unit 18 may provide a visual or audible alarm if the measured amount of tracer gas exceeds a pre-established minimum.

The component which sets leak detector 10 apart from prior art detectors is the plastic film cover 20 for the probe inflow opening. This cover is illustrated in detail in FIG. 2 and is supported between mesh screens 21 and 22 which abut the upstream and downstream ends, respectively, of the film. It is well-known that plastic films exhibit selective permeability to various gases, the selectivity being derived from both the pore size of the film relative to the diameter of the gas molecules and from the solubility relationships between the particular plastic film and the gases being separated. The phenomenon is described in U.S. PAT. No. 2,966,235; test results for permeability of various gases through various plastic films are set forth in Major et al., "Gas Permeability of Plastics," *Modern Plastics*, vol. 39, no. 11, July 1962, pp. 135 et seq. From the foregoing references it is possible to select from a variety of tracer gases to which the selected films are highly permeable.

The most desirable tracer gas is helium because of its inert characteristics, its low atomic mass, and its monatomic molecular form. Helium molecules, in fact, are the smallest stable gas molecules. Because of these characteristics the plastic film pore size can be made sufficiently small as to block significant passage of any molecule larger than the helium molecule. In this regard, I have found that the plastic film currently being manufactured by E. I. duPont de Nemours and Co. under the trademark Mylar is particularly permeable to helium as compared to oxygen and other gases found in the normal ambient environment. In fact the permeability of helium through a one mil thick Mylar sheet at room temperature is at least two orders of magnitudes (i.e., — one hundred times) greater than the permeability of any other gas in the atmosphere.

The selectivity of plastic film 20 affords numerous advantages for leak detector 10. One advantage is the fact that for some applications detector 17 may be a low level gas flow measuring device rather than a conventional helium or other tracer gas discriminating device. More specifically, since the permeability through plastic film 20 of all of the gases in the ambient atmosphere is relatively constant at a given temperature, the flow through the leak detector is relatively constant in the absence of large concentrations of the tracer gas. This flow increases sharply in the presence of a leak, however, because the pressurized tracer gas leaked from the system under test passes through film 20 at a significantly greater rate than the atmospheric constituents. This flow increase can be sensed by detector 17 and a suitable indication or alarm can be registered at unit 18.

Another advantage afforded by the selectively permeable film 20 relates to the fact that the flow and build-up of contaminants in the leak detector are substantially eliminated. The leak detector thus requires less maintenance and less "down-time" for repair. Further, the time and equipment required to clean the test environment and units under test for prior art leak detectors can be eliminated entirely with a leak detector employing the plastic film probe.

Still another advantage of the selective permeability of the probe is the fact that the flow inlet opening can be made as large as desired. This is possible because film 20 severely restricts the inflow of gases other than the tracer gas so that atmospheric gases cannot dilute and mask the tracer gas as would be the case if prior art probes were provided with larger flow openings. The large flow opening permitted by film 20 is advantageous because it permits a greater inflow rate of tracer gas for a given pressure at vacuum pump 16; the speed of response and the sensitivity of leak detector 10 are therefore greater than in prior art leak detectors. The large inflow opening also permits leaks to be detected over a relatively large area of a container 12 without requiring movement of the probe over that area as is required in prior art leak detectors. In the system of FIG. 1, for example, the tracer gas-pressurized containers 12 are simply transported past leak detector 10 with seam 11 exposed to probe 14. The probe inflow opening is simply made large enough to detect leaks along the entire length of seam 11 without moving the probe. Leak detection is thus much faster and more simply performed than was possible in the prior art.

Another advantage of the selectively permeable probe of the present invention resides in the fact that it may be formed in substantially any configuration. This advantage is illustrated quite clearly in FIGS. 3 and 4 where the probe is configured in the form of a generally U-shaped hood 26. One or more inner walls of hood 26 is formed from a selectively permeable plastic film 27 supported on both sides by mesh screens 28 and 29. The inner walls of the hood are spaced from the outer walls to define a flow region 31 which is evacuated by vacuum pump 32 acting through detector 33. Detector 33 and pump 32 are of the same types as detector 17 and pump 16 of FIG. 1. Likewise an indicator and/or alarm unit 34 of the same type as unit 18 is provided.

A conveyor 36 passes under hood 26 and carries closed tanks 37 which are internally pressurized with the tracer gas. A tracer gas leak from any tank passing under hood 26 is drawn through the plastic film 27 and is subsequently detected at detector 33. In this manner the entire tank 37 may be rapidly tested for leaks during a single pass through hood 26. The same advantages, including increased sensitivity, fast response, and contaminant-free operation are present for the embodiment of FIGS. 3 and 4 as were described in relation to FIG. 1. Once again the plastic film may be selected from a variety of such films and the tracer gas may be selected from a variety of gases. Helium tracer gas and Mylar film are also useful in the FIG. 3 and 4 embodiment.

It will be appreciated that not all three walls of hood 26 need be made of the selectively permeable plastic film. For example, if helium is employed as the tracer gas, since helium is relatively light and tends to rise, only the top wall of the hood need be made of the plastic film.

Still another embodiment of the present invention is illustrated in FIG. 5 wherein the selectively permeable plastic film 41 is in the form of a bell jar. Film 41 is once again supported on each side by mesh screens 42 and 43 which are also in the shape of a bell jar. The film and screen unit is secured at its bottom to a solid base member 44 to form an enclosure in which an evacuated unit under test 46 is located. The unit under test, which is to be tested for its vacuum maintenance capability is connected by a flow passage 47 to a detector 48. Vacuum pump 49 draws gas from unit 46 through passage 47 and detector 48. An indicator and/or alarm unit 51 is also provided. Elements 48, 49 and 51 correspond in type to elements 17, 16 and 18, respectively, of FIG. 1.

A stream of tracer gas is sprayed over the outer surface of the plastic film 41 from nozzle source 52. Since the tracer gas permeates the plastic film more readily than other gases in the atmosphere, the gas composition inside the enclosure and around the unit under test 46 will consist primarily of tracer gas. If there is a vacuum leak in the unit under test 46, the tracer gas enters the unit through leak and is drawn through passage 47 to detector 48 where it is detected. The leak is indicated accordingly at unit 49.

While I have described and illustrated specific embodiments of my invention, it will be clear that variations of the details of construction which are specifically illustrated and described may be resorted to without departing from the true spirit and scope of the invention as defined in the appended claims.

We claim:

1. A mass spectrometer leak detector for detecting leakage of a predetermined tracer gas from an enclosure to be tested which is internally pressurized with said tracer gas, said leak detector comprising:

mass spectrometer means for detecting the presence of said tracer gas therein;

a flow path having its outlet end connected to deliver gas flow to said mass spectrometer means and an inlet end, said inlet end having a substantially greater cross-section than said outlet end and being covered with a thin film material having a relatively high permeability to said tracer gas; and means for establishing a pressure differential across said flow path which tends to draw gases into said flow path.

2. The leak detector according to claim 1 wherein the permeability of said thin film to said tracer gas is at least two orders of magnitude greater than the permeability of said thin film to other atmospheric gases.

3. The leak detector according to claim 1 wherein said inlet end is fixed in position, and further comprising conveyor means for successively transporting a series of said internally pressurized enclosures to be tested past the inlet end of said flow path.

4. The combination according to claim 3 wherein said inlet end of said flow path is located adjacent said conveyor means and wherein said series of enclosures are positioned on said conveyor means such that a specified region of each enclosure passes proximate said inlet end of said flow path.

5. The combination according to claim 3 wherein said inlet end of said flow path is in the form of a hood in which said thin film corresponds to at least one internal wall, and wherein said conveyor means is arranged to transport said enclosures beneath said hood such that tracer gas leaking from said enclosures is drawn into said flow path through said thin film.

6. The combination according to claim 5 wherein all internal walls of said hood constitute said thin film.

7. The combination according to claim 1 wherein said enclosure to be tested has a first dimension along which leak detection is to be performed and wherein said inlet end of said probe has at least one dimension substantially equal to said first dimension.

8. A leak detector for detecting leakage of a predetermined tracer gas into an evacuated closed container under test, said leak detector comprising:

an enclosure for said container under test, at least one wall of said enclosure being formed from a thin plastic film which has a significantly larger permeability to said tracer gas than to other atmospheric gases;

means for flowing said tracer gas into said enclosure through said one wall; and means for monitoring the content of said tracer gas in said evacuated unit under test.

* * * * *